US012566747B2

(12) United States Patent
Manevich et al.

(10) Patent No.: US 12,566,747 B2
(45) Date of Patent: Mar. 3, 2026

(54) RECURSIVE ENDORSEMENTS FOR DATABASE ENTRIES

(71) Applicant: International Business Machines Corporation, Armonk, NY (US)

(72) Inventors: Yacov Manevich, Beer Sheva (IL); Hagar Meir, Tel Aviv (IL); Nitin Gaur, Round Rock, TX (US)

(73) Assignee: International Business Machines Corporation, Armonk, NY (US)

( * ) Notice: Subject to any disclaimer, the term of this patent is extended or adjusted under 35 U.S.C. 154(b) by 686 days.

(21) Appl. No.: 17/819,952

(22) Filed: Aug. 16, 2022

(65) Prior Publication Data

US 2024/0061828 A1     Feb. 22, 2024

(51) Int. Cl.
*G06F 16/23*       (2019.01)
*G06F 16/2455*     (2019.01)
*G06F 21/64*       (2013.01)

(52) U.S. Cl.
CPC .... *G06F 16/2365* (2019.01); *G06F 16/24566* (2019.01); *G06F 21/64* (2013.01)

(58) Field of Classification Search
CPC . G06F 16/2365; G06F 16/24566; G06F 21/64
See application file for complete search history.

(56) References Cited

U.S. PATENT DOCUMENTS

| | | | | |
|---|---|---|---|---|
| 2020/0167339 A1* | 5/2020 | Manevich | | H04L 9/0643 |
| 2020/0267002 A1* | 8/2020 | Yuan | | H04L 9/3255 |
| 2020/0336294 A1* | 10/2020 | Sun | | G06F 30/20 |
| 2020/0380154 A1* | 12/2020 | Jayachandran | | H04L 9/3239 |
| 2021/0126787 A1* | 4/2021 | Sen | | H04L 9/3263 |
| 2021/0256010 A1* | 8/2021 | Sinclair | | G06F 16/2379 |
| 2021/0297253 A1* | 9/2021 | Irazabal | | G06F 16/2365 |
| 2022/0044316 A1* | 2/2022 | Gaur | | G06Q 20/3825 |
| 2022/0069977 A1* | 3/2022 | Manevich | | H04L 9/32 |
| 2022/0173885 A1* | 6/2022 | Behl | | H04L 9/002 |

FOREIGN PATENT DOCUMENTS

CN           113901138 A      1/2022

OTHER PUBLICATIONS

Gorenflo et al., "FastFabric: Scaling hyperledger fabric to 20 000 transactions per second", Special Issue Paper, Accepted: Jan. 21, 2020, Int J Network Mgmt. 2020, 18 pages, <https://onlinelibrary.wiley.com/doi/10.1002/nem.2099>.
Sukhwani et al., "Performance Modeling of Hyperledger Fabric (Permissioned Blockchain Network)", © 2018 IEEE, 10 pages.
Vukolic, Marko, "Rethinking Permissioned Blockchains", BCC'17 Apr. 2, 2017, Abu Dhabi, United Arab Emirates © 2017, ACM ISBN 978-1-4503-4974-1/17/04, 5 pages, <https://dl.acm.org/doi/abs/10.1145/3055518.3055526>.

* cited by examiner

*Primary Examiner* — Jared M Bibbee
(74) *Attorney, Agent, or Firm* — Stephen R. Yoder

(57)       ABSTRACT

Recursive endorsements in a decentralized database minimize validation effort for a smart contract because there are fewer signatures to verify. Collected endorsements required by an endorsement policy are verified and signed by a set of trusted peers representing different organizations, the set of trusted peers being fewer than the number of endorsing peers. Prior to validation, the target transaction is submitted with all required endorsements and the signatures of the set of trusted peers. Validation is performed by verifying only the signatures of the set of trusted peers.

17 Claims, 9 Drawing Sheets

100

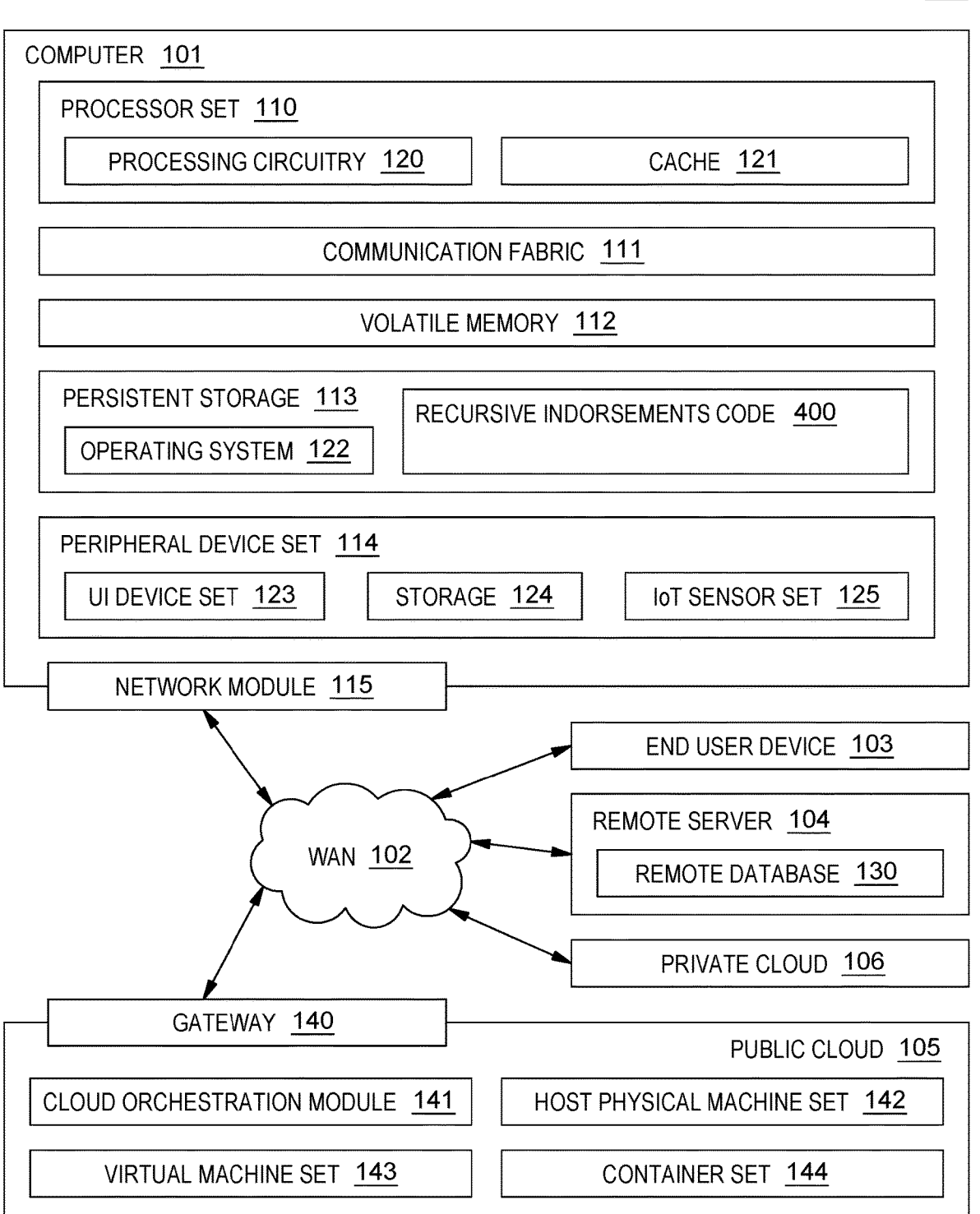

COMPUTER  101

PROCESSOR SET  110

PROCESSING CIRCUITRY  120          CACHE  121

COMMUNICATION FABRIC  111

VOLATILE MEMORY  112

PERSISTENT STORAGE  113

OPERATING SYSTEM  122          RECURSIVE INDORSEMENTS CODE  400

PERIPHERAL DEVICE SET  114

UI DEVICE SET  123          STORAGE  124          IoT SENSOR SET  125

NETWORK MODULE  115

WAN  102

END USER DEVICE  103

REMOTE SERVER  104

REMOTE DATABASE  130

PRIVATE CLOUD  106

GATEWAY  140

PUBLIC CLOUD  105

CLOUD ORCHESTRATION MODULE  141          HOST PHYSICAL MACHINE SET  142

VIRTUAL MACHINE SET  143          CONTAINER SET  144

RECURSIVE ENDORSEMENTS CODE    400

POLICY MOD
405

SUBMIT MOD
425

ENDORSEMENT MOD
410

VERIFY MOD
430

TRUSTED PEERS MOD
415

VALIDATE MOD
435

REQUEST MOD
420

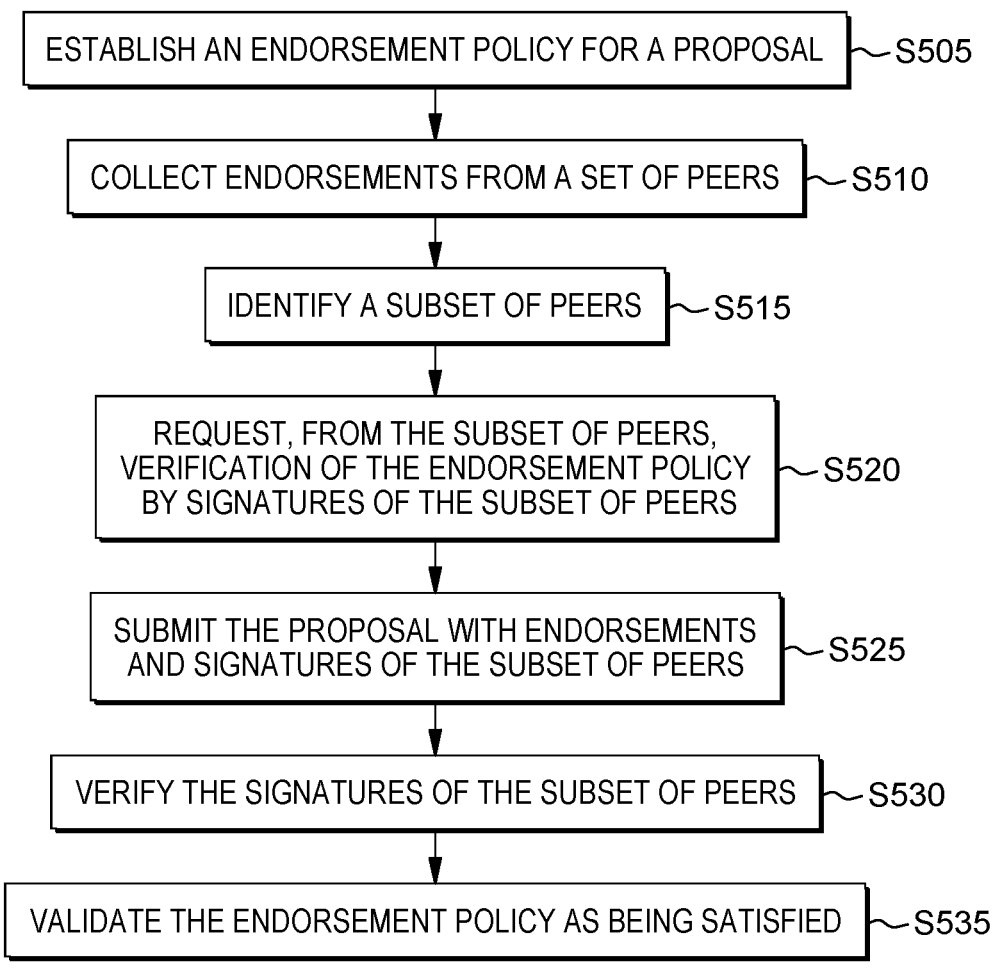

500

ESTABLISH AN ENDORSEMENT POLICY FOR A PROPOSAL — S505

COLLECT ENDORSEMENTS FROM A SET OF PEERS — S510

IDENTIFY A SUBSET OF PEERS — S515

REQUEST, FROM THE SUBSET OF PEERS, VERIFICATION OF THE ENDORSEMENT POLICY BY SIGNATURES OF THE SUBSET OF PEERS — S520

SUBMIT THE PROPOSAL WITH ENDORSEMENTS AND SIGNATURES OF THE SUBSET OF PEERS — S525

VERIFY THE SIGNATURES OF THE SUBSET OF PEERS — S530

VALIDATE THE ENDORSEMENT POLICY AS BEING SATISFIED — S535

RECURSIVE ENDORSEMENTS FOR DATABASE ENTRIES

BACKGROUND

The present invention relates generally to the field of managing endorsements, and more particularly to validating endorsements of database entries.

A centralized database stores and maintains data in one single database (e.g., database server) at one location. This location is often a central computer, for example, a desktop central processing unit (CPU), a server CPU, or a mainframe computer. Information stored on a centralized database is typically accessible from multiple different points. Multiple users or client workstations can work simultaneously on the centralized database, for example, based on a client/server configuration. A centralized database is easy to manage, maintain, and control, especially for purposes of security because of its single location. Within a centralized database, data redundancy is minimized as a single storing place of all data also implies that a given set of data only has one primary record.

However, a centralized database suffers from significant drawbacks. For example, a centralized database has a single point of failure. In particular, if there are no fault-tolerance considerations and a hardware failure occurs (for example a hardware, firmware, and/or a software failure), all data within the database is lost and work of all users is interrupted. In addition, centralized databases are highly dependent on network connectivity. As a result, the slower the connection, the amount of time needed for each database access is increased. Another drawback is the occurrence of bottlenecks when a centralized database experiences high traffic due to a single location. Furthermore, a centralized database provides limited access to data because only one copy of the data is maintained by the database. As a result, multiple devices cannot access the same piece of data at the same time without creating significant problems or risk overwriting stored data. Furthermore, because a database storage system has minimal to no data redundancy, data that is unexpectedly lost is very difficult to retrieve other than through manual operation from back-up storage.

Conventionally, a centralized database must perform many endorsement validations for new entries which are encrypted and received with signatures of authorized parties. As such, what is needed is a solution to overcome these significant drawbacks.

SUMMARY

In one aspect of the present invention, a method, a computer program product, and a system includes: identifying a new proposal and corresponding endorsement policy, selecting trusted peers from a set of endorsers required by the endorsement policy, receiving signatures of the trusted peers and endorsements from the set of endorsers, and verifying the signatures of the trusted peers to validate the endorsement policy as being satisfied. The signatures provided by the trusted peers are received as verification of the endorsement policy. The signatures of the trusted peers are the only signatures received from the set of endorsers.

BRIEF DESCRIPTION OF THE SEVERAL VIEWS OF THE DRAWINGS

FIG. 1 is a schematic view of a first embodiment of a system according to the present invention;

FIG. 5 is a flowchart showing a method performed, at least in part, by the first embodiment system;

DETAILED DESCRIPTION

Figure 2A:
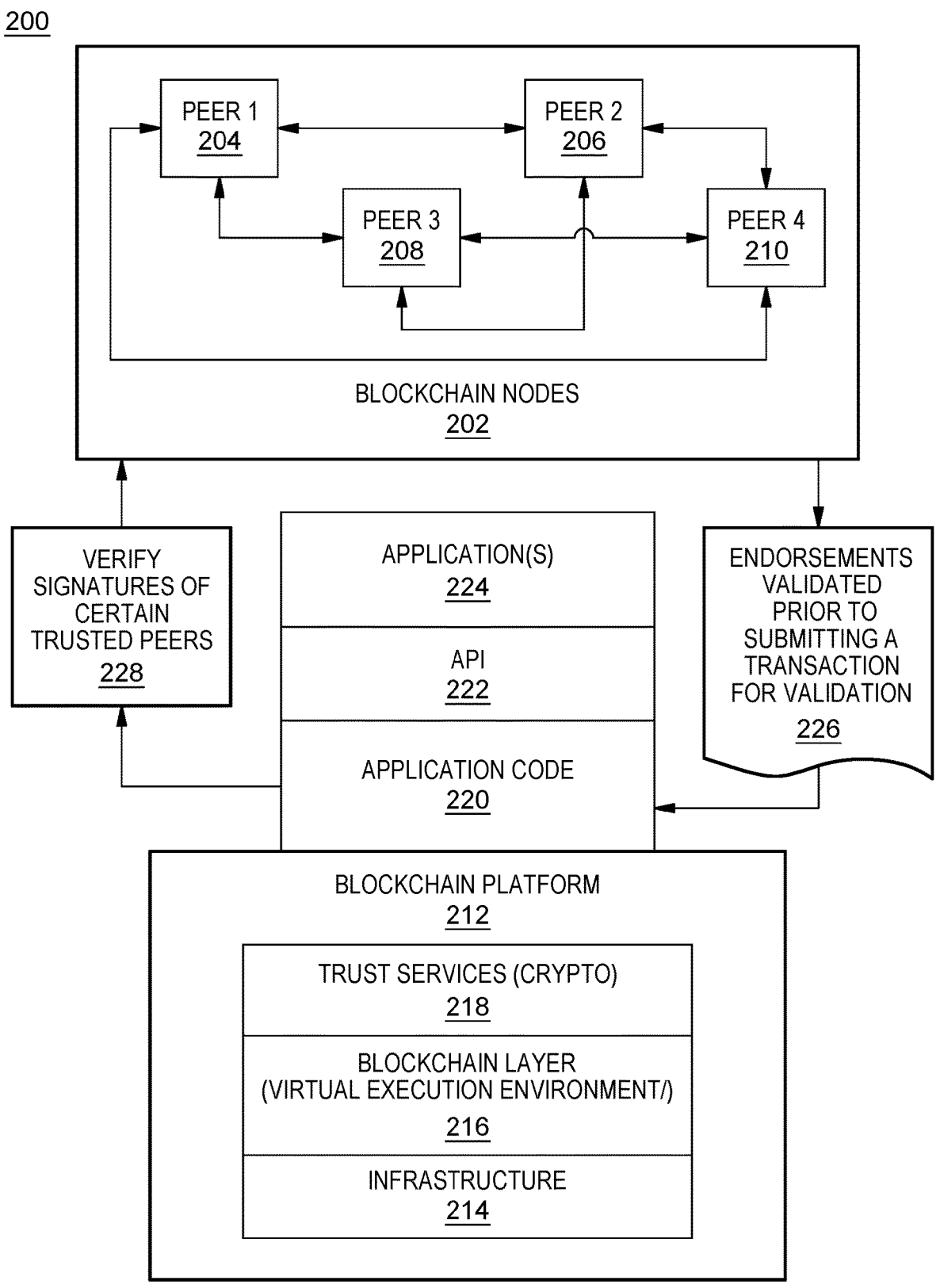
FIG. 2A is an example peer node configuration according to some example embodiments of the present invention.

Recursive endorsements in a decentralized database minimize validation effort for a smart contract because there are fewer signatures to verify. Collected endorsements required by an endorsement policy are verified and signed by a set of trusted peers representing different organizations, the set of trusted peers being fewer than the number of endorsing peers. Prior to validation, the target transaction is submitted with all required endorsements and the signatures of the set of trusted peers. Validation is performed by verifying only the signatures of the set of trusted peers. The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Computing environment 100 contains an example of an environment for the execution of at least some of the computer code involved in performing the inventive methods, such as recursive endorsements code 400. In addition to block 400, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and block 400, as identified above), peripheral device set 114 (including user interface (UI), device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

COMPUTER 101 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

PROCESSOR SET 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip."

In some computing environments, processor set 110 may be designed for working with qubits and performing quantum computing.

Computer readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 121 and the other storage media discussed below. The program instructions, and associated data, are accessed by processor set 110 to control and direct performance of the inventive methods. In computing environment 100, at least some of the instructions for performing the inventive methods may be stored in block 400 in persistent storage 113.

COMMUNICATION FABRIC 111 is the signal conduction paths that allow the various components of computer 101 to communicate with each other. Typically, this fabric is made of switches and electrically conductive paths, such as the switches and electrically conductive paths that make up busses, bridges, physical input/output ports and the like. Other types of signal communication paths may be used, such as fiber optic communication paths and/or wireless communication paths.

VOLATILE MEMORY 112 is any type of volatile memory now known or to be developed in the future. Examples include dynamic type random access memory (RAM) or static type RAM. Typically, the volatile memory is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

PERSISTENT STORAGE 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data and re-writing of data. Some familiar forms of persistent storage include magnetic disks and solid state storage devices. Operating system 122 may take several forms, such as various known proprietary operating systems or open source Portable Operating System Interface type operating systems that employ a kernel. The code included in block 400 typically includes at least some of the computer code involved in performing the inventive methods.

PERIPHERAL DEVICE SET 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion type connections (for example, secure digital (SD) card), connections made though local area communication networks and even connections made through wide area networks such as the internet. In various embodiments, UI device set 123 may include components such as a display screen, speaker, microphone, wearable devices (such as goggles and smart watches), keyboard, mouse, printer, touchpad, game controllers, and haptic devices. Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (for example, where computer 101 locally stores and manages a large database) then this storage may be provided by peripheral storage devices designed for storing very large amounts of data, such as a storage area network (SAN) that is shared by multiple, geographically distributed computers. IoT sensor set 125 is made up of sensors that can be used in Internet of Things applications. For example, one sensor may be a thermometer and another sensor may be a motion detector.

NETWORK MODULE 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (for example, embodiments that utilize software-defined networking (SDN)), the control functions and the forwarding functions of network module 115 are performed on physically separate devices, such that the control functions manage several different network hardware devices. Computer readable program instructions for performing the inventive methods can typically be downloaded to computer 101 from an external computer or external storage device through a network adapter card or network interface included in network module 115.

WAN 102 is any wide area network (for example, the internet) capable of communicating computer data over non-local distances by any technology for communicating computer data, now known or to be developed in the future. In some embodiments, the WAN may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 103 is any computer system that is used and controlled by an end user (for example, a customer of an enterprise that operates computer 101), and may take any of the forms discussed above in connection with computer 101. EUD 103 typically receives helpful and useful data from the operations of computer 101. For example, in a hypothetical case where computer 101 is designed to provide a recommendation to an end user, this recommendation would typically be communicated from network module 115 of computer 101 through WAN 102 to EUD 103. In this way, EUD 103 can display, or otherwise present, the recommendation to an end user. In some embodiments, EUD 103 may be a client device, such as thin client, heavy client, mainframe computer, desktop computer and so on.

REMOTE SERVER 104 is any computer system that serves at least some data and/or functionality to computer

101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a recommendation based on historical data, then this historical data may be provided to computer 101 from remote database 130 of remote server 104.

PUBLIC CLOUD 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 106 is similar to public cloud 105, except that the computing resources are only available for use by a single enterprise. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

A decentralized database is a distributed storage system which includes multiple nodes that communicate with each other. A blockchain is an example of a decentralized database which includes an append-only immutable data structure resembling a distributed ledger capable of maintaining records between mutually untrusted parties. The untrusted parties are referred to herein as peers or peer nodes. Each peer maintains a copy of the database records and no single peer can modify the database records without a consensus being reached among the distributed peers. For example, the peers may execute a consensus protocol to validate blockchain storage entries, group the storage entries into blocks, and build a hash chain over the blocks. This process forms the ledger by ordering the storage entries, as is necessary, for consistency. In a public or permission-less blockchain, anyone can participate without a specific identity. Public blockchains often involve native cryptocurrency and use consensus based on various protocols such as Proof of Work (PoW). On the other hand, a permissioned blockchain database provides a system which can secure inter-actions among a group of entities which share a common goal but which do not fully trust one another, such as businesses that exchange funds, goods, information, and the like.

Nodes are the communication entities of the blockchain system. A "node" may perform a logical function in the sense that multiple nodes of different types can run on the same physical server. Nodes are grouped in trust domains and are associated with logical entities that control them in various ways. Nodes may include different types, such as a client or submitting-client node which submits an entry-invocation to an endorser (e.g., peer), and broadcasts entry-proposals to an ordering service (e.g., ordering node). Another type of node is a peer node which can receive client submitted entries, commit the entries and maintain a state and a copy of the ledger of blockchain entries. In some blockchains where transaction execution happens before its ordering, the transactions are simulated on a subgroup of peers. Such peers are called "endorsing peers" or "endorsers".

A ledger is a sequenced, tamper-resistant record of all state transitions of a blockchain. State transitions may result from smart contract invocations (i.e., entries) submitted by participating parties (e.g., client nodes, ordering nodes, endorser nodes, peer nodes, etc.). An entry may result in a set of asset key-value pairs being committed to the ledger as one or more operands, such as creates, updates, deletes, and the like. The ledger includes a blockchain (also referred to as a chain) which is used to store an immutable, sequenced record in blocks. The ledger also includes a state database which maintains a current state of the blockchain.

A blockchain is an entry log which is structured as hash-linked blocks, and each block contains a sequence of N entries where N is equal to or greater than one. The block header includes a hash of the block's entries, as well as a hash of the prior block's header. In this way, all entries on the ledger may be sequenced and cryptographically linked together. Accordingly, it is not possible to tamper with the ledger data without breaking the hash links. A hash of a most recently added blockchain block represents every entry on the chain that has come before it, making it possible to ensure that all peer nodes are in a consistent and trusted state. The blockchain may be stored on a peer node file system (i.e., local, attached storage, cloud, etc.), efficiently supporting the append-only nature of the blockchain workload.

The current state of the immutable ledger represents the latest values for all keys that are included in the blockchain entry log. Because the current state represents the latest key values known to the blockchain, it is sometimes referred to as a world state. Smart contract invocations execute entries against the current state data of the ledger. To make interactions efficient, the latest values of the keys may be stored in a state database. The state database may be simply an indexed view into the blockchain's entry log, it can therefore be regenerated from the blockchain at any time. The state database may automatically be recovered (or generated if needed) upon peer node startup, and before entries are accepted.

Blockchain is different from a traditional database in that blockchain is not a central storage but rather a decentralized, immutable, and secure storage, where nodes must share in changes to records in the storage. Some properties that are inherent in blockchain and which help implement the blockchain include, but are not limited to, an immutable ledger, smart contracts, security, privacy, decentralization, consensus, endorsement, accessibility, and the like, which are further described herein. In the context of blockchain, nodes make up the infrastructure. A blockchain node is one of the computers that run the blockchain's software to validate and store the complete history of transactions on the network. Because blockchain is decentralized, there is no central storage location, but it is stored in computers or systems across the network.

FIG. 2A illustrates a blockchain architecture configuration 200, according to example embodiments. Referring to FIG. 2A, the blockchain architecture 200 may include certain blockchain elements, for example, a group of blockchain nodes 202. The blockchain nodes may be represented in FIG. 1 as computer 101, end user device 103, or cloud-based virtual machines in private cloud 106 or public cloud 105, within virtual machine set 143. The blockchain nodes 202 may include one or more nodes 204-210 (these four nodes are depicted by example only). These nodes participate in a number of activities, such as blockchain entry addition and validation process (consensus). One or more of the blockchain nodes 204-210 may endorse entries based on a given endorsement policy and may provide an ordering service for all blockchain nodes in the architecture 200. A blockchain node may initiate a blockchain authentication and seek to write to a blockchain immutable ledger stored in blockchain layer 216, a copy of which may also be stored on the underpinning physical infrastructure 214. The blockchain configuration may include one or more applications 224 which are linked to application programming interfaces (APIs) 222 to access and execute stored program/application code 220 (e.g., smart contracts, etc.) which can be created according to a customized configuration sought by participants and can maintain their own state, control their own assets, and receive external information. One example storage location for applications 224, APIS 222, and application code 220 is persistent storage 113, where recursive endorsements code 400 is stored (FIG. 1). The application code can be deployed as an entry and installed, via appending to the distributed ledger, on all blockchain nodes 204-210.

The blockchain base or platform 212 may include various layers of blockchain data, services (e.g., cryptographic trust services, virtual execution environment, etc.), and underpinning physical computer infrastructure that may be used to receive and store new entries and provide access to auditors which are seeking to access data entries. The blockchain layer 216 may expose an interface that provides access to the virtual execution environment necessary to process the program code and engage the physical infrastructure 214. Cryptographic trust services 218 may be used to verify entries such as asset exchange entries and keep information private.

The blockchain architecture configuration of FIG. 2A may process and execute program/application code 220, such as recursive endorsement code 400 (FIG. 1), via one or more interfaces exposed, and services provided, by blockchain platform 212. The code 220 may control blockchain assets. For example, the code 220 can store and transfer data, and may be executed by nodes 204-210 in the form of a smart contract and associated with conditions or other code elements subject to its execution. As a non-limiting example, smart contracts may be created to execute reminders, updates, and/or other notifications subject to the changes, updates, etc. The smart contracts can themselves be used to identify rules associated with authorization and access requirements and usage of the ledger. For example, the information may include endorsements validated prior to submitting a transaction for validation 226. The process may then perform validation of a specified endorsement policy by verifying signatures of certain trusted peers 228. The physical infrastructure 214 may be utilized to retrieve any of the data or information described herein.

A smart contract may be created via a high-level application and programming language, and then written to a block in the blockchain. The smart contract may include executable code which is registered, stored, and/or replicated with a blockchain (e.g., distributed network of blockchain peers). An entry is an execution of the smart contract code which can be performed in response to conditions associated with the smart contract being satisfied. The executing of the smart contract may trigger a trusted modification(s) to a state of a digital blockchain ledger. The modification(s) to the blockchain ledger caused by the smart contract execution may be automatically replicated throughout the distributed network of blockchain peers through one or more consensus protocols.

The smart contract may write data to the blockchain in the format of key-value pairs. Furthermore, the smart contract code can read the values stored in a blockchain and use them in application operations. The smart contract code can write the output of various logic operations into the blockchain. The code may be used to create a temporary data structure in a virtual machine or other computing platform. Data written to the blockchain can be public and/or can be encrypted and maintained as private. The temporary data that is used/generated by the smart contract is held in memory by the supplied execution environment, then deleted once the data needed for the blockchain is identified.

Figure 2B:
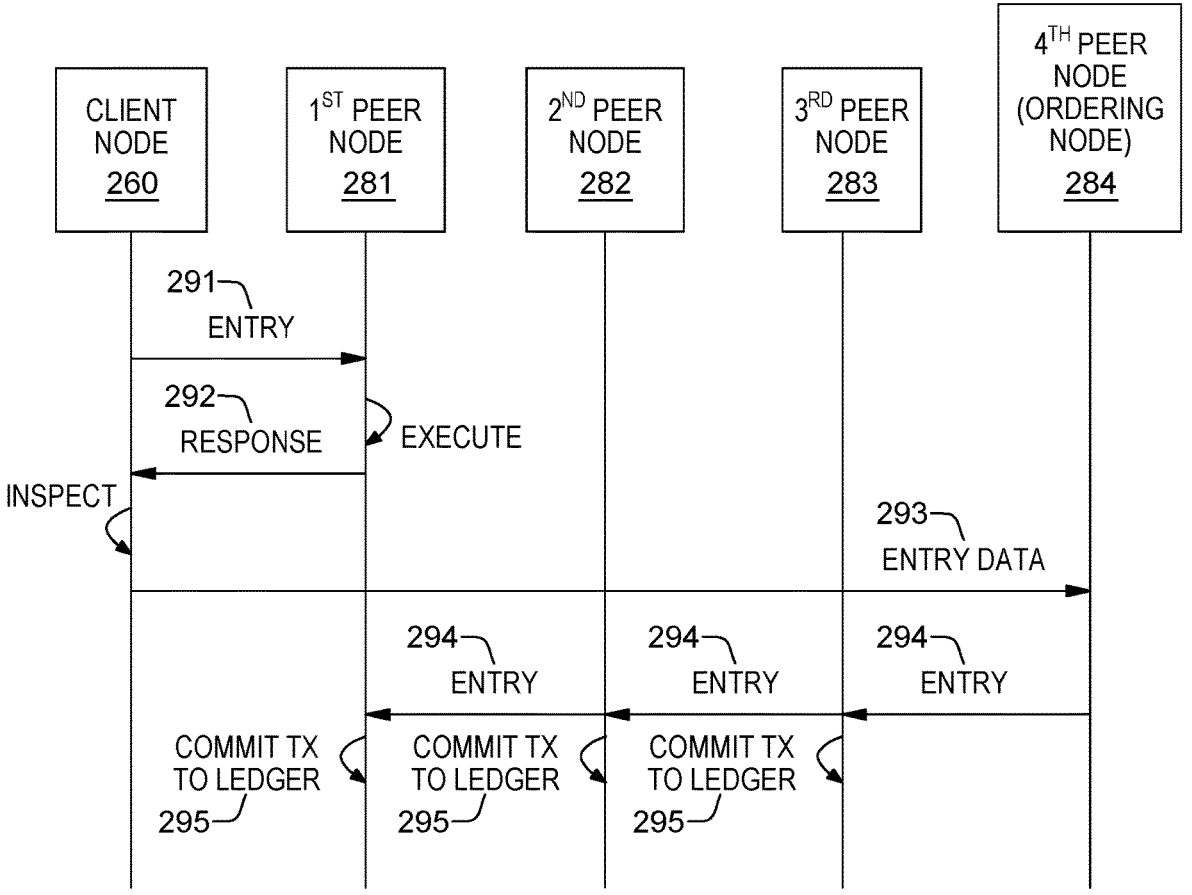
FIG. 2B is a further peer node configuration according to some example embodiments of the present invention.

FIG. 2B illustrates an example of a flow 250 between nodes of the blockchain in accordance with an example embodiment. Referring to FIG. 2B, the entry flow may include an entry proposal 291 sent by an application client node 260 to an endorsing peer node 281. The endorsing peer 281 may verify the client signature and execute a smart contract function to initiate the entry. The output may include the smart contract execution results, a set of key/value versions that were read in the smart contract (read set), and the set of keys/values that were written in a smart contract (write set). The proposal response 292 is sent back to the client 260 along with an endorsement signature, if approved. The client 260 assembles the signatures into an entry payload 293 and broadcasts it to an ordering service node 284. The ordering service node 284 then delivers ordered entries as blocks to all peers 281-283. Before commit to the blockchain, each peer 281-283 may validate the entry. For example, the peers may check an endorsement policy defined in the blockchain to ensure that the correct allotment of the specified peers have signed the results and authenticated the signatures against the entry payload 293.

Referring again to FIG. 2B, the client node 260 initiates the entry (smart contract proposal) 291 by constructing and sending a request to the peer node 281, which is an endorser. The proposal is a request to invoke a smart contract function so that data can be read and/or written to the ledger (i.e., write new key value pairs for the assets).

In response, the endorsing peer node 281 may verify (a) that the entry proposal is well formed, (b) the entry has not been submitted already in the past (replay-attack protection), (c) the signature is valid, and (d) that the submitter (client 260, in the example) is properly authorized to perform the proposed operation. The endorsing peer node 281 may take the entry proposal inputs as arguments to the invoked smart contract function. The smart contract is then executed against a current state database to produce entry results including a response value, read set, and write set. However, no updates are made to the ledger at this point. In 292, the set of values, along with the signature of the endorsing peer node 281 is passed back as a proposal response 292 to the client 260 which parses the payload for the application to consume.

In response, the application of the client 260 inspects/verifies the signatures of the endorsing peers and compares the proposal responses to determine if the proposal response is the same. If the smart contract only queried the ledger, the application would inspect the query response and would typically not submit the entry to the ordering node service 284. If the client application intends to submit the entry to the ordering node service 284 to update the ledger, the application determines if the specified endorsement policy has been fulfilled before submitting (i.e., did all peer nodes necessary for the entry endorse the entry).

After successful inspection, in step 293 the client 260 assembles signatures into an entry and broadcasts the entry proposal and response within an entry message to the ordering node 284. The entry may contain the read/write sets, and the signatures of endorsing peers or only those signatures requested of a trusted set of peers selected from the endorsing peers. The ordering node 284 does not need to inspect the entire content of an entry in order to perform its operation, instead the ordering node 284 may simply receive transactions and batch them into blocks.

The blocks of the transactions are delivered from the ordering node 284 to all peer nodes 281-283 eligible to receive them. The transactions 294 within the block are validated to ensure all policies are fulfilled and to ensure that there have been no changes to ledger state for read set variables since the read set was generated by the entry execution. Transactions in the block are tagged as being valid or invalid. Furthermore, in step 295 each peer node 281-283 appends the block to the blockchain, and for each valid transaction the write sets are committed to the state database.

Figure 3:
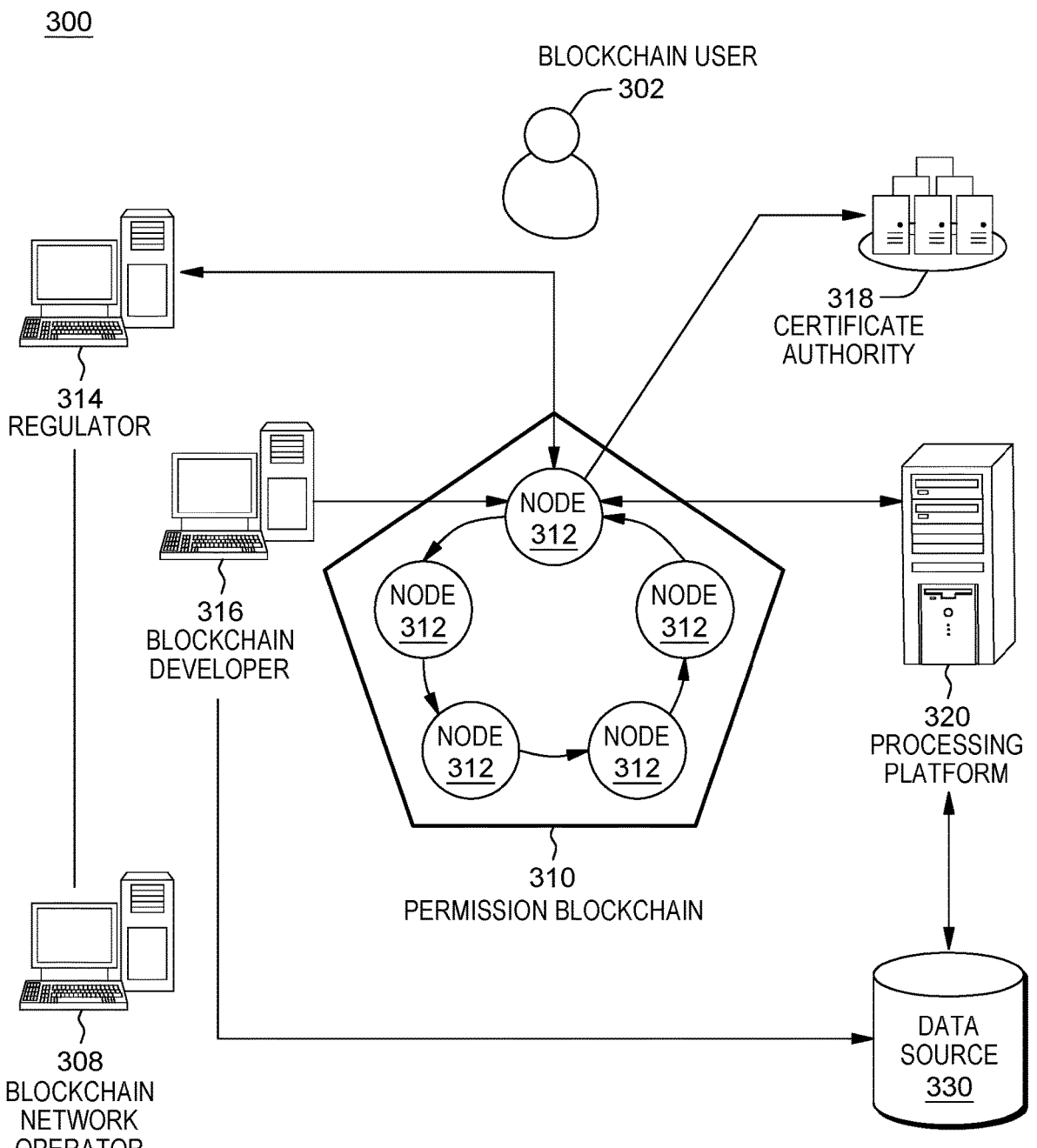
FIG. 3 is a permissioned network according to some example embodiments of the present invention.

FIG. 3 illustrates an example of a permissioned blockchain network 300, which features a distributed, decentralized peer-to-peer architecture, and a certificate authority 318 managing user roles and permissions. In this example, the blockchain user 302 may submit an entry to the permissioned blockchain network 310. Trusted business networks may provide access to regulator systems 314, such as auditors (the Securities and Exchange Commission in a U.S. equities market, for example). Meanwhile, a blockchain network operator 308 manages member permissions, such as enrolling the regulator system 314 as an "auditor" and the blockchain user 302 as a "client." An auditor could be restricted only to querying the ledger whereas a client could be authorized to invoke smart contracts and transact on the blockchain.

A blockchain developer system 316 writes smart contracts and client-side applications that use processing platform 320 for computing interfaces and data processing. To include credentials from a traditional data source 330 in smart contracts, the developer system 316 could use an out-of-band connection to access the data. In this example, the blockchain user 302 connects to the network through a peer node 312 in connection with data processing platform 320. Before proceeding with any entries, the peer node 312 retrieves the user's enrollment and entry certificates from the certificate authority 318. In some cases, blockchain users must possess these digital certificates in order to transact on the permissioned blockchain network 310.

The programs described herein are identified based upon the application for which they are implemented in a specific embodiment of the present invention. However, it should be appreciated that any particular program nomenclature herein is used merely for convenience, and thus the present invention should not be limited to use solely in any specific application identified and/or implied by such nomenclature.

Recursive endorsements code 400 operates to allow certain trusted peers to provide signature over the smart contract proposal, the ordered set of endorsements from all required endorsing peers, and the corresponding endorsement policy. According to some embodiments of the present invention, trusted peers are selected according to the number of contracting organizations such that representation of the organizations is maintained.

Some embodiments of the present invention recognize the following facts, potential problems and/or potential areas for improvement with respect to the current state of the art: (i) conventional validation practice is for each peer to verify each signature, totaling dozens to hundreds of signature verifications, which leads to degrading the throughput of the system; (ii) endorsement policies can be parametrized, and the parameters can be specified by a deploy transaction; (iii) is it conventional for each validating peer to check to make sure that the transaction, or proposal, contains the appropriate number of endorsements and that they are from the expected sources, as specified in the endorsement policy; and (iv) when a regular endorsement is entered, the peer is essentially stating "I attest that an execution of a smart contract with given input, has certain world state changes" and the signature of the peer is over the smart contract input and output.

An endorsement policy is a condition on what endorses a transaction. Blockchain peers have a pre-specified set of endorsement policies that are referenced by a deploy transaction that installs specific chain code. Every chain code has an endorsement policy that specifies the set of peers on a channel that must execute the chain code and endorse the execution results in order for the transaction to be considered valid. These endorsement policies define the organizations by way of their peers who must "endorse," or approve of, the execution of a proposal.

As part of the transaction validation step performed by the blockchain peers, each validating peer checks to make sure that the transaction contains the appropriate number of endorsements and that they are from the expected sources, as specified in the endorsement policy. The endorsements are also checked for valid signatures from valid certificates.

Some embodiments of the present invention are directed to facilitating endorsement policies requiring many organizations, through their peers, from dozens to hundreds of different organizations. During validation, conventional practice is for each peer to verify each signature, totaling dozens to hundreds of signature verifications, which leads to degrading the throughput of the system.

Some embodiments of the present invention are directed to validating the endorsements prior to submitting the transaction for validation. In that way, during the validation phase, only a few signature verifications are required.

When a regular endorsement is entered, the peer is essentially stating "I attest that an execution of a smart contract with given input, has certain world state changes." The signature of the peer is over the smart contract input and output. However, when a recursive endorsement is entered according to some embodiments of the present invention, the peer is essentially stating "I attest that I have verified that the specified endorsement policy is satisfied by the set of endorsements." The signature of the peer is over the smart contract input and output, the ordered set of endorsements, and the specified, or marked, endorsement policy.

Some embodiments of the present invention are directed to variations in conventional endorsement and validation phases in blockchain transaction, or proposal, validation. According to some embodiments of the present invention, the endorsement phase includes: (i) collecting required endorsements according to a governing endorsement policy (it should be noted that the governing endorsement policy is marked as the specific policy controlling the endorsements even if later amendments are made); (ii) request a subset of all the peers required to endorse the execution of the proposal to verify the governing endorsement policy and provide a signature. The subset of peers are trusted peers representing the different organizations; and submitting the transaction with all endorsements and collected signatures of the trusted peers.

According to some embodiments of the present invention, the validation phase includes: (i) verifying the signature of a trusted peer (e.g. from your organization) instead of verifying the endorsements of each peer require by the endorsement policy; (ii) validating that endorsement policy is satisfied based on the verified signatures of the trusted peers. It should be noted that other peers may also use these validations where the other peers trust the signing peer(s).

Some embodiments of the present invention use a recursive endorsement scheme to reduce validation time and effort compared to a conventional endorsement process. Further, some embodiments of the present invention mark the endorsement policy that is used when performing the recursive endorsement in order to preserve correctness even with concurrent endorsement policy modifications. When using recursive endorsement, the particular version of the governing endorsement policy used at the time of signing over the proposal remains in effect through validation and should be recorded as such because the governing policy may be updated by the time the recursive endorsement reaches validation.

Figure 4:
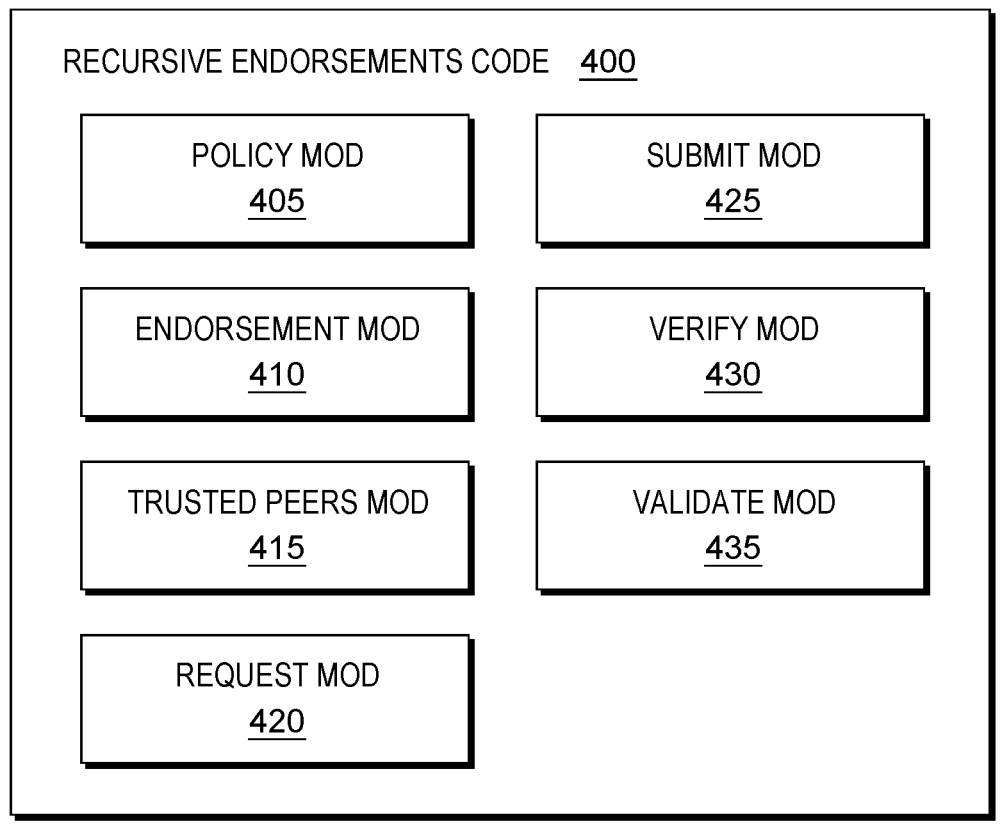
FIG. 4 is a schematic view of a machine logic (for example, software) portion of the first embodiment system.

FIG. 5 shows flowchart 500 depicting a first method according to the present invention. FIG. 4 shows program 400 for performing at least some of the method steps of flowchart 500. This method and associated software will now be discussed, over the course of the following paragraphs, with extensive reference to FIG. 5 (for the method step blocks) and FIG. 4 (for the software blocks).

Processing begins at step S505, where policy module ("mod") 405 establishes an endorsement policy for a proposal, or transaction.

Processing proceeds to step S510, where endorsement mod 410 collects endorsements from a set of peers. In this example, the set of peers is defined by the established endorsement policy. According to some embodiments of the present invention, the various peers of the set of peers are associated with multiple organizations bound under a smart contract related to the proposal.

Processing proceeds to step S515, where trusted peers mod 415 identifies a subset of peers. The subset of peers is selected from the set of peers from whom endorsements are collected. In this example, the subset of peers includes at least one peer from each organization of the multiple organization under contract. Alternatively, the subset of peers is identified according to assigned role or to proximity based on geographic locations of the peers in the set of peers.

Processing proceeds to step S520, where request mod 420 requests, from the subset of peers, verification of the established endorsement policy by each peer of the subset of peers providing a signature. In this example, only certain peers provide signatures verifying that the endorsement policy is satisfied by the collected endorsements.

Processing proceeds to step S525, where submit mod 425 submits the proposal with endorsements and signatures of the subset of peers. The signatures of the submitted proposal serve to attest that trusted peers have verified that the endorsement policy is satisfied by the endorsements provided in the submission. In that way, each endorser has not provided a signature to be verified but only some of the endorsers, trusted peers, submit signatures to be verified during a validation phase.

Processing proceeds to step S530, where verify mod 430 verifies the signatures of the subset of peers. Because the proposal is submitted with signatures of trusted peers along with all the required endorsements, only the signatures of the trusted peers need to be verified to complete the validation of the proposal.

Processing ends at step S535, where validate mod 435 validates the endorsement policy as being satisfied. In this example, the validate module performs the validation based upon signatures of only a subset of the endorsing peers.

Further embodiments of the present invention are discussed in the paragraphs that follow and later with reference to FIGS. 6A, 6B, and 6C.

Some embodiments of the present invention are directed to minimizing signature verifications in execute-order blockchains through a recursive signing process.

Some embodiments of the present invention are directed to a technique that includes the steps of: (i) acquiring signatures on execution results; (ii) validating the acquired signatures by parties of the blockchain; (iii) having certain trusted parties sign over signature validity of the acquired signatures; and (iv) at transaction validation time, upon block commit, each node only considers the signature validity of a trusted party without validating all the signatures.

Some embodiments of the present invention do more than minimize signature verification in execute-order blockchains. Some embodiments of the present invention do more than acquire signatures on execution results. Some embodiments of the present invention do more than validate signatures by parties of the blockchain and have certain parties sign over signature validity of the aforementioned acquired signatures.

Some embodiments of the present invention are directed to only considering by each node the signature validity of a trusted party upon reaching the transaction validation time and upon block commit with no need to validate all signatures of the peers required by the endorsement policy.

Some embodiments of the present invention are directed to marking the endorsement policy that is used when performing the recursive endorsement to preserve correctness if the endorsement policy changes during the process or prior to validation.

Some embodiments of the present invention are directed to validating the marked endorsement policy and signing over the results as part of an endorsement. Validation is performed according to the marked endorsement policy on which the signatures of the trusted peers is based.

Some embodiments of the present invention are directed to checking the recursive endorsement at validation time instead of checking the base endorsement policy.

Figure 6A:
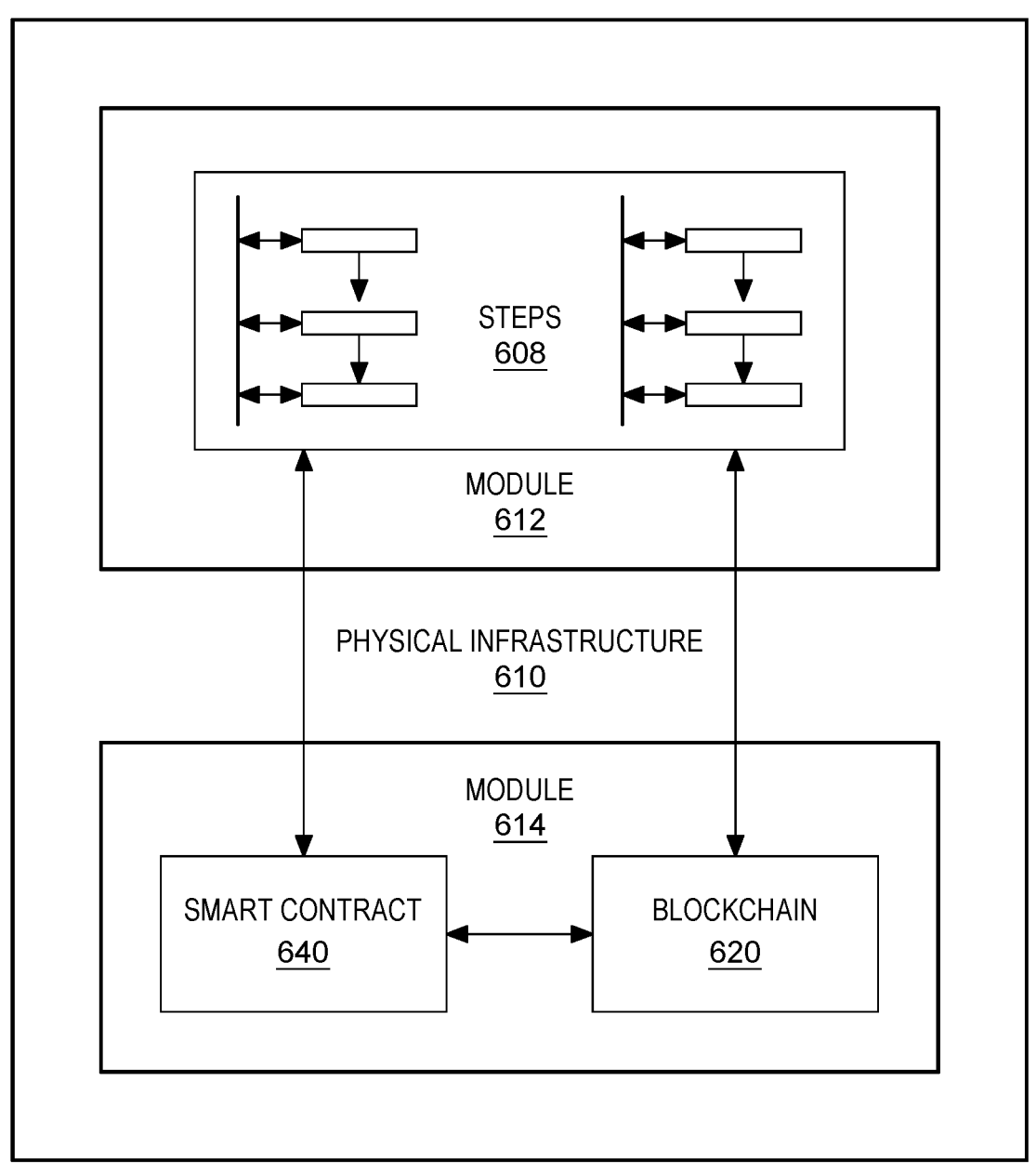
FIG. 6A is an example system configured to perform one or more operations described herein according to some example embodiments of the present invention.

FIG. 6A illustrates an example system 600 that includes a physical infrastructure 610 configured to perform various operations according to example embodiments. Referring to FIG. 6A, the physical infrastructure 610 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6B:
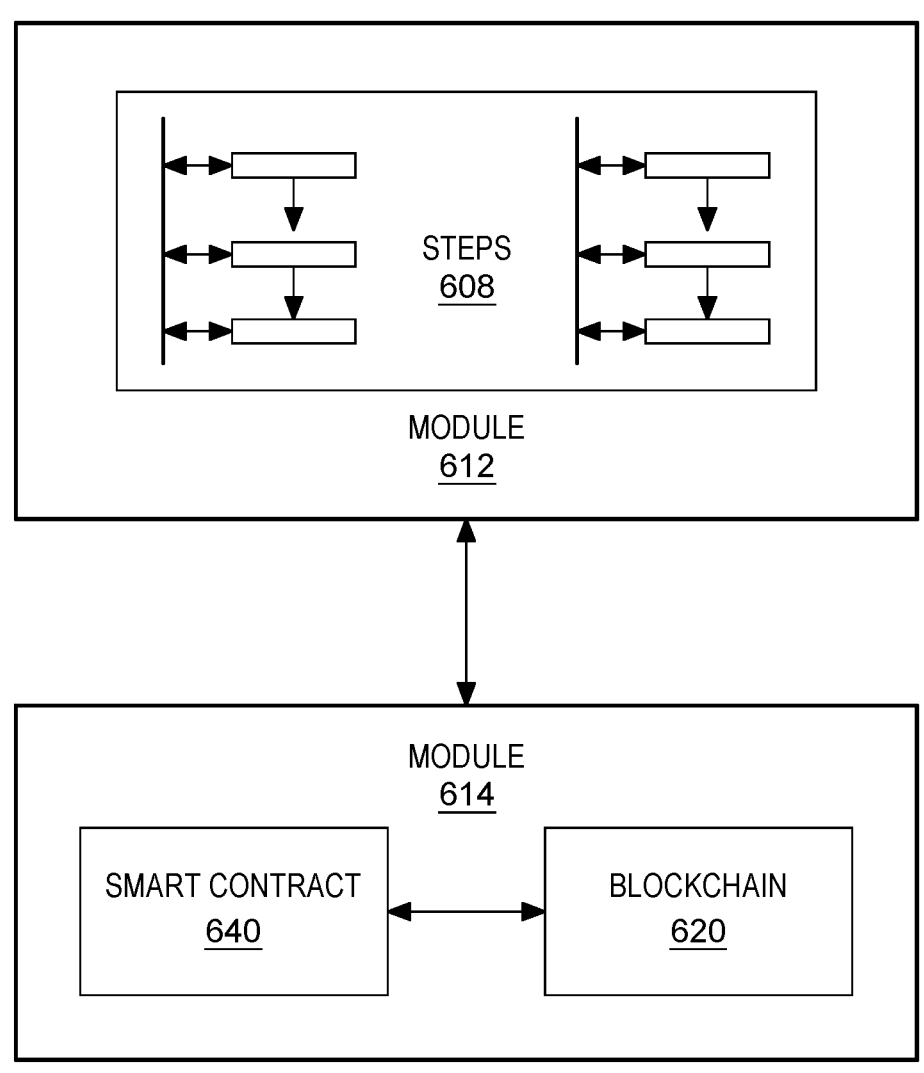
FIG. 6B is a further example system configured to perform one or more operations described herein according to some example embodiments of the present invention.

FIG. 6B illustrates an example system 640 configured to perform various operations according to example embodiments. Referring to FIG. 6B, the system 640 includes a module 612 and a module 614. The module 614 includes a blockchain 620 and a smart contract 630 (which may reside on the blockchain 620), that may execute any of the operational steps 608 (in module 612) included in any of the example embodiments. The steps/operations 608 may include one or more of the embodiments described or depicted and may represent output or written information that is written or read from one or more smart contracts 630 and/or blockchains 620. The physical infrastructure 610, the module 612, and the module 614 may include one or more computers, servers, processors, memories, and/or wireless communication devices. Further, the module 612 and the module 614 may be a same module.

Figure 6C:
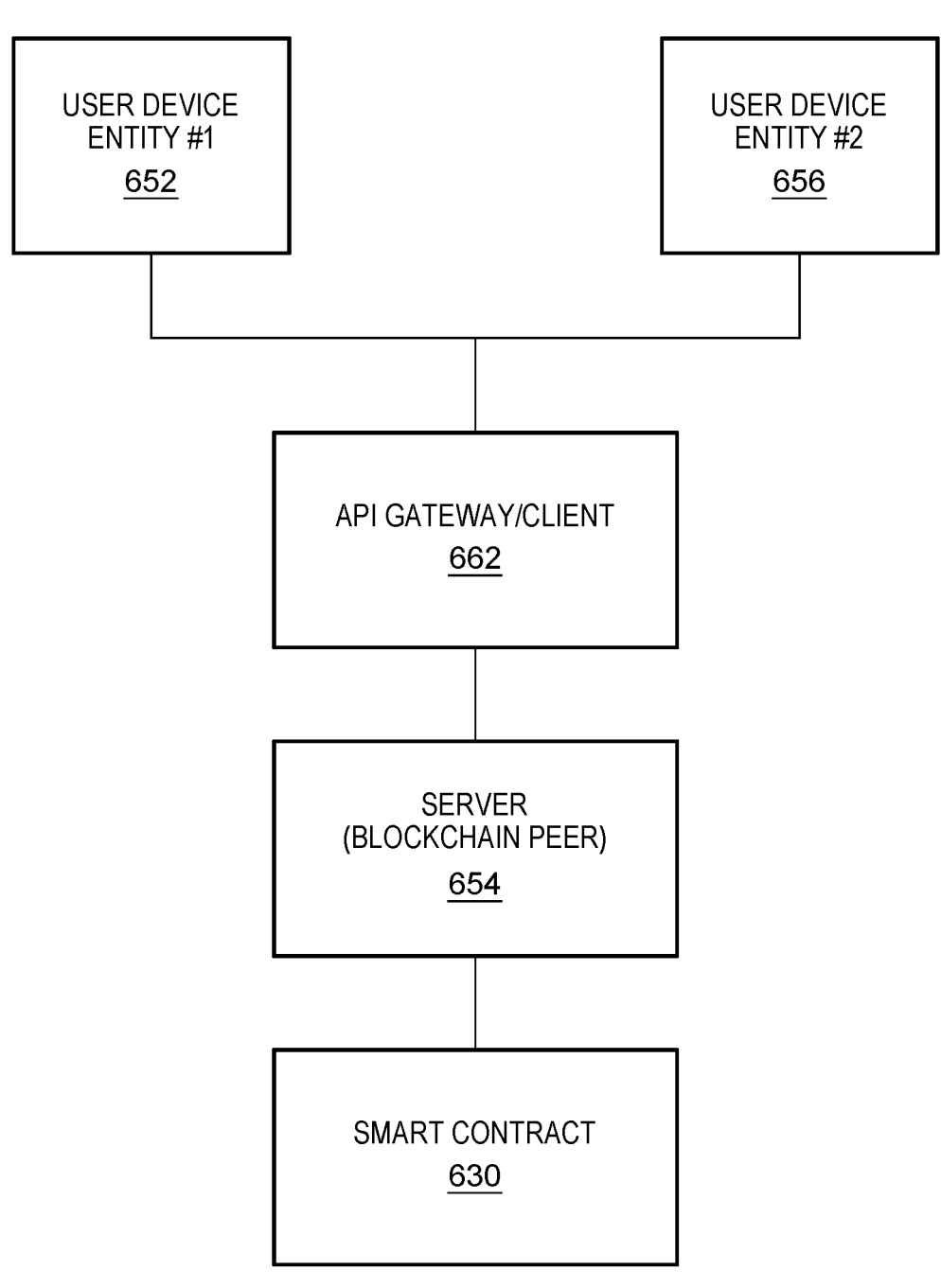
FIG. 6C is an additional example system according to some example embodiments of the present invention.

FIG. 6C illustrates a common interface 660 for accessing logic and data of a blockchain, according to example embodiments. Referring to the example of FIG. 6C, an application programming interface (API) gateway 662 provides a common interface for accessing blockchain logic (e.g., smart contract 630) and data (e.g., distributed ledger, etc.). In this example, the API gateway 662 is a common interface for performing entries on the blockchain by connecting one or more entities 652 and 656 to a blockchain peer (i.e., server 654). Here, the server 654 is a blockchain network peer component that holds a copy of the world state and a distributed ledger allowing clients 652 and 656 to query data on the world state as well as submit entries into the blockchain network where, depending on the smart contract 630 and policies, endorsing peers will run the smart contracts 630.

Some embodiments of the present invention may include one, or more, of the following features, characteristics and/or advantages: (i) during the validation phase, only a few signature verifications are required even when there are numerous endorsing peers required by the endorsement policy; (ii) the validation time is reduced with respect to the regular endorsement process; (iii) reduced validation effort compared to a conventional endorsement process; (iv) increased overall throughput of the system; (v) improved validation latency; (vi) especially effective when the endorsement policy requires many signatures; (vii) an overall speedup in transaction validation; (viii) provide improvement in the system's performance because of fewer signature verification checks; and/or (ix) improves upon the state of the art in permissioned blockchains, namely fabric.

Some embodiments of the present invention are directed to a computer-implemented method including: identifying a new proposal and corresponding endorsement policy, selecting trusted peers from a set of endorsers required by the endorsement policy, receiving signatures of the trusted peers and endorsements from the set of endorsers, and verifying the signatures of the trusted peers to validate the endorsement policy as being satisfied. The signatures provided by the trusted peers are received as verification of the endorsement policy. The signatures of the trusted peers are the only signatures received from the set of endorsers.

One aspect of the computer-implemented method disclosed herein may include requesting, from the trusted peers, verification of the endorsement policy.

Another aspect of the computer-implemented method disclosed herein may include responsive to verifying only the signatures of the trusted peers, validating the endorsement policy as being satisfied.

Yet another aspect of the computer-implemented method disclosed herein may include collecting the endorsements from the set of endorsers.

Still yet another aspect of the computer-implemented method disclosed herein may be that the set of endorsers includes peers from a plurality of organizations.

A further aspect of the computer-implemented method disclosed herein may be that the trusted peers include representative peers from each organization of the plurality of organizations.

A still further aspect of the computer-implemented method disclosed herein may be that the signatures of the trusted peers are over the new proposal input and output, an ordered set of endorsements from the set of endorsers, and the corresponding endorsement policy.

Some embodiments of the present invention are directed toward a computer program product comprising a computer-readable storage medium having a set of instructions stored therein which, when executed by a processor, causes the processor to perform a method including: identifying a new proposal and corresponding endorsement policy, selecting trusted peers from a set of endorsers required by the endorsement policy, receiving signatures of the trusted peers and endorsements from the set of endorsers; and verifying the signatures of the trusted peers to validate the endorsement policy as being satisfied. The signatures provided by the trusted peers are received as verification of the endorsement policy. The signatures of the trusted peers are the only signatures received from the set of endorsers.

One aspect of the computer program product may further cause the processor to perform a method including requesting, from the trusted peers, verification of the endorsement policy.

Another aspect of the computer program product may further cause the processor to perform a method including responsive to verifying only the signatures of the trusted peers, validating the endorsement policy as being satisfied.

Yet another aspect of the computer program product may further cause the processor to perform a method including collecting the endorsements from the set of endorsers.

Still yet another aspect of the computer program product may be that the set of endorsers includes peers from a plurality of organizations.

A further aspect of the computer program product may be that the trusted peers include representative peers from each organization of the plurality of organizations.

A still further aspect of the computer program product may be that the signatures of the trusted peers are over the new proposal input and output, an ordered set of endorsements from the set of endorsers, and the corresponding endorsement policy.

Some embodiments of the present invention are directed toward a computer system including: a processor set; and a computer readable storage medium. The processor set is structured, located, connected, and/or programmed to run program instructions stored on the computer readable storage medium. The program instructions, when executed by the processor set, cause the processor set to perform a method including identifying a new proposal and corresponding endorsement policy, selecting trusted peers from a set of endorsers required by the endorsement policy, receiving signatures of the trusted peers and endorsements from the set of endorsers, and verifying the signatures of the trusted peers to validate the endorsement policy as being satisfied. The signatures provided by the trusted peers are received as verification of the endorsement policy. The signatures of the trusted peers are the only signatures received from the set of endorsers.

One aspect of the computer system may further cause the processor to perform a method including requesting, from the trusted peers, verification of the endorsement policy.

Another aspect of the computer system may further cause the processor to perform a method including responsive to verifying only the signatures of the trusted peers, validating the endorsement policy as being satisfied.

Yet another aspect of the computer system may further cause the processor to perform a method including collecting the endorsements from the set of endorsers.

Still yet another aspect of the computer system may be that the set of endorsers includes peers from a plurality of organizations.

A further aspect of the computer program product may be that the trusted peers include representative peers from each organization of the plurality of organizations.

A still further aspect of the computer program product may be that the signatures of the trusted peers are over the new proposal input and output, an ordered set of endorsements from the set of endorsers, and the corresponding endorsement policy.

Some helpful definitions follow:

Present invention: should not be taken as an absolute indication that the subject matter described by the term "present invention" is covered by either the claims as they are filed, or by the claims that may eventually issue after patent prosecution; while the term "present invention" is used to help the reader to get a general feel for which disclosures herein that are believed as maybe being new, this understanding, as indicated by use of the term "present invention," is tentative and provisional and subject to change over the course of patent prosecution as relevant information is developed and as the claims are potentially amended.

Embodiment: see definition of "present invention" above—similar cautions apply to the term "embodiment."

and/or: inclusive or; for example, A, B "and/or" C means that at least one of A or B or C is true and applicable.

User/subscriber: includes, but is not necessarily limited to, the following: (i) a single individual human; (ii) an artificial intelligence entity with sufficient intelligence to act as a user or subscriber; and/or (iii) a group of related users or subscribers.

Module/Sub-Module: any set of hardware, firmware and/or software that operatively works to do some kind of function, without regard to whether the module is: (i) in a single local proximity; (ii) distributed over a wide area; (iii) in a single proximity within a larger piece of software code; (iv) located within a single piece of software code; (v) located in a single storage device, memory or medium; (vi) mechanically connected; (vii) electrically connected; and/or (viii) connected in data communication.

Computer: any device with significant data processing and/or machine readable instruction reading capabilities including, but not limited to: desktop computers, mainframe computers, laptop computers, field-programmable gate array (FPGA) based devices, smart phones, personal digital assistants (PDAs), body-mounted or inserted computers, embedded device style computers, application-specific integrated circuit (ASIC) based devices.

What is claimed is:

1. A computer-implemented method comprising:

identifying, by a blockchain node, a smart contract and a particular version of an endorsement policy;

selecting, according to application code executed by the blockchain node, trusted peers from a set of endorsers required by the particular version of the endorsement policy, the trusted peers selected for representation of each contracting organization in the smart contract;

receiving signatures from the trusted peers;

prior to submitting the smart contract for validation, receiving recursive endorsements from the set of endorsers, the recursive endorsements being verifications that the particular version of the endorsement policy is satisfied by the received signatures; and verifying, according to the application code, only the signatures of the trusted peers to validate the particular version of endorsement policy as being satisfied;

wherein:

the signatures provided by the trusted peers are received as verification of the particular version of the endorsement policy; and the signatures of the trusted peers are the only signatures received from the set of endorsers.

2. The computer-implemented method of claim 1, further comprising:

requesting, from the trusted peers, verification of the particular version of the endorsement policy.

3. The computer-implemented method of claim 1, further comprising:

responsive to verifying only the signatures of the trusted peers, validating the particular version of the endorsement policy as being satisfied.

4. The computer-implemented method of claim 1, further comprising:

collecting the endorsements from the set of endorsers.

5. The computer-implemented method of claim 1, wherein:

the set of endorsers includes peers from a plurality of organizations.

6. The computer-implemented method of claim 1, wherein:

the signatures of the trusted peers are over input and output of the smart contract, an ordered set of endorsements from the set of endorsers, and the particular version of the endorsement policy.

7. A computer program product comprising a computer-readable storage medium having a set of instructions stored therein which, when executed by a processor, causes the processor to perform a method comprising:

identifying, by a blockchain node, a smart contract and a particular version of an endorsement policy;

selecting, according to application code executed by the blockchain node, trusted peers from a set of endorsers required by the particular version of the endorsement policy, the trusted peers selected for representation of each contracting organization in the smart contract;

receiving signatures from the trusted peers;

prior to submitting the smart contract for validation, receiving recursive endorsements from the set of endorsers, the recursive endorsements being verifications that the particular version of the endorsement policy is satisfied by the received signatures; and verifying, according to the application code, only the signatures of the trusted peers to validate the particular version of endorsement policy as being satisfied;

wherein:

the signatures provided by the trusted peers are received as verification of the particular version of the endorsement policy; and the signatures of the trusted peers are the only signatures received from the set of endorsers.

8. The computer program product of claim 7, further causing the processor to perform a method comprising:

requesting, from the trusted peers, verification of the particular version of the endorsement policy.

9. The computer program product of claim 7, further causing the processor to perform a method comprising:

responsive to verifying only the signatures of the trusted peers, validating the particular version of the endorsement policy as being satisfied.

10. The computer program product of claim 7, further causing the processor to perform a method comprising:

collecting the endorsements from the set of endorsers.

11. The computer program product of claim 7, wherein:

the set of endorsers includes peers from a plurality of organizations.

12. The computer program product of claim 7, wherein:

the signatures of the trusted peers are over input and output of the smart contract, an ordered set of endorsements from the set of endorsers, and the particular version of the endorsement policy.

13. A computer system comprising:

a processor set; and a computer readable storage medium;

wherein:

the processor set is structured, located, connected, and/or programmed to run program instructions stored on the computer readable storage medium; and the program instructions which, when executed by the processor set, cause the processor set to perform a method comprising:

identifying, by a blockchain node, a smart contract and a particular version of an endorsement policy;

selecting, according to application code executed by the blockchain node, trusted peers from a set of endorsers required by the particular version of the endorsement policy, the trusted peers selected for representation of each contracting organization in the smart contract;

receiving signatures from the trusted peers;

prior to submitting the smart contract for validation, receiving recursive endorsements from the set of endorsers, the recursive endorsements being verifications that the particular version of the endorsement policy is satisfied by the received signatures; and verifying, according to the application code, only the signatures of the trusted peers to validate the particular version of endorsement policy as being satisfied;

wherein:

the signatures provided by the trusted peers are received as verification of the particular version of the endorsement policy; and the signatures of the trusted peers are the only signatures received from the set of endorsers.

14. The computer system of claim 13, further causing the processor to perform a method comprising:

requesting, from the trusted peers, verification of the particular version of the endorsement policy.

15. The computer system of claim 13, further causing the processor to perform a method comprising:

responsive to verifying only the signatures of the trusted peers, validating the particular version of the endorsement policy as being satisfied.

16. The computer system of claim 13, wherein:

the set of endorsers includes peers from a plurality of organizations.

17. The computer system of claim 13, wherein:

the signatures of the trusted peers are over input and output of the smart contract, an ordered set of endorsements from the set of endorsers, and the particular version of the endorsement policy.

* * * * *